United States Patent [19]

Hauck et al.

[11] Patent Number: 5,099,197
[45] Date of Patent: Mar. 24, 1992

[54] METHOD OF DETERMINING THE ROTATIONAL SPEED OF A MACHINE, AND DEVICE FOR PERFORMING THE METHOD

[75] Inventors: Dieter Hauck, Eberbach; Karl-Heinz May, Viernheim; Hans Müller, Sandhausen; Jürgen Rehberger, Dossenheim, all of Fed. Rep. of Germany

[73] Assignee: Heidelberger Druckmaschinen AG, Heidelberg, Fed. Rep. of Germany

[21] Appl. No.: 719,086

[22] Filed: Jun. 19, 1991

Related U.S. Application Data

[63] Continuation of Ser. No. 348,985, May 8, 1989, abandoned.

[30] Foreign Application Priority Data

May 6, 1988 [DE] Fed. Rep. of Germany ....... 3815530

[51] Int. Cl.$^5$ ............................................... G01P 3/56
[52] U.S. Cl. .................................... 324/161; 364/565
[58] Field of Search ................ 324/160, 161, 166; 364/565; 318/654, 655, 659, 660, 661, 683

[56] References Cited

U.S. PATENT DOCUMENTS 4,305,025 12/1981 Arnold .
4,484,137 11/1984 Chang .................................. 324/166

FOREIGN PATENT DOCUMENTS 3333392 3/1984 Fed. Rep. of Germany .
3543058 6/1987 Fed. Rep. of Germany .
3722099 1/1988 Fed. Rep. of Germany .
8704025 7/1987 World Int. Prop. O. .

OTHER PUBLICATIONS

Publication "Regelungsbechnik", vol. 26, 1978, Issue 11, pp. 349–380, article Drehzahlregelung ...
Publication "Proceedings IECON '87, 1987 Inbl. Conference on Industrial Electronics, Control, and Instrumentation", Cambridge, Mass., Nov. 3–6, 1987, pp. 184–186, I. Dobe and M. Iganashi.

Primary Examiner—Kenneth A. Wieder
Assistant Examiner—Warren S. Edmonds
Attorney, Agent, or Firm—Herbert L. Lerner; Laurence A. Greenberg

[57] ABSTRACT

Method of determining the rotational speed of a machine having a drive into which a setpoint value for the rotational speed has been introduced and a rotational-speed sensor from which a measured actual value is obtainable, which comprises feeding the setpoint value to a mathematical model of a controlled system formed by the drive and the machine, deriving from the output of the mathematical model a computed actual value, determining the difference between the measured actual value and the computed actual value, forming the absolute value of the difference, and, if the absolute amount of the difference is exceeded, passing on the computed actual value, and if the absolute amount of the difference is not exceeded, passing on the measured actual value; and device for performing the method as the determined rotational speed of the machine.

10 Claims, 2 Drawing Sheets

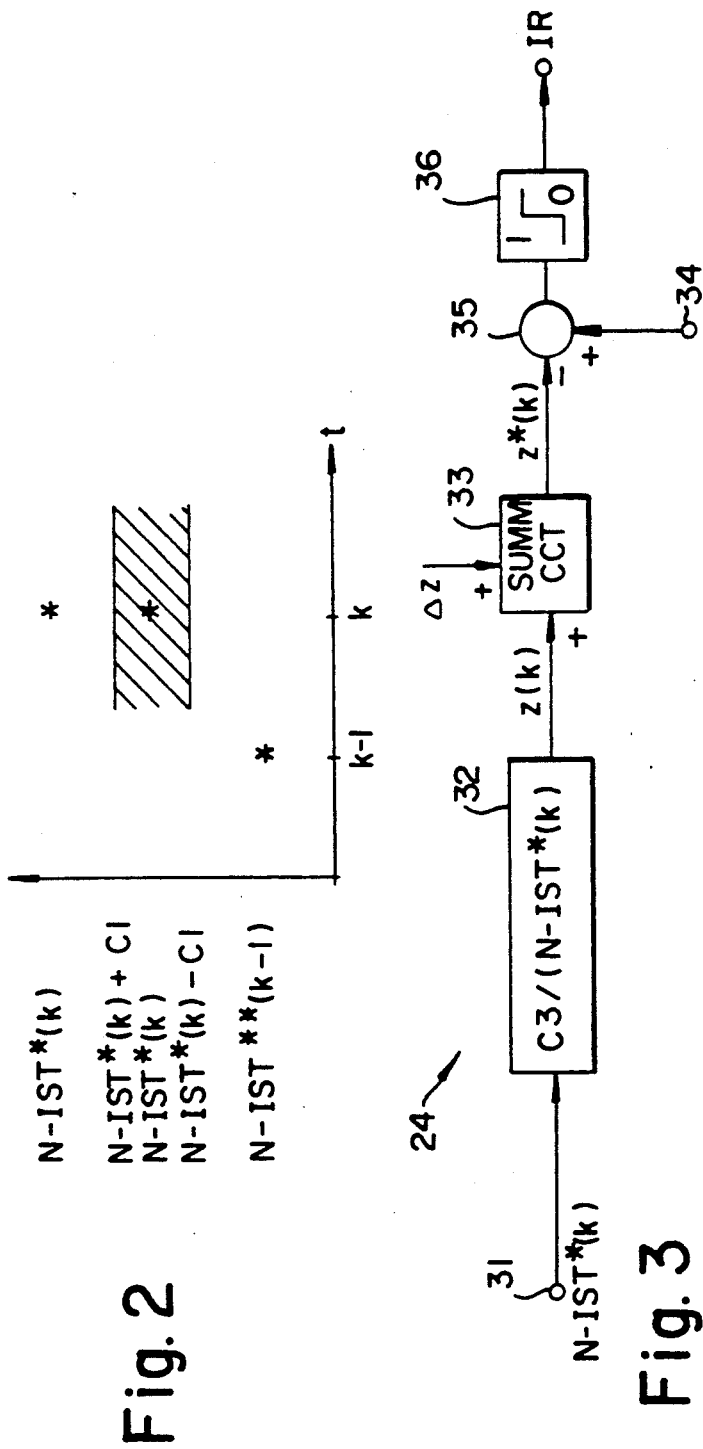
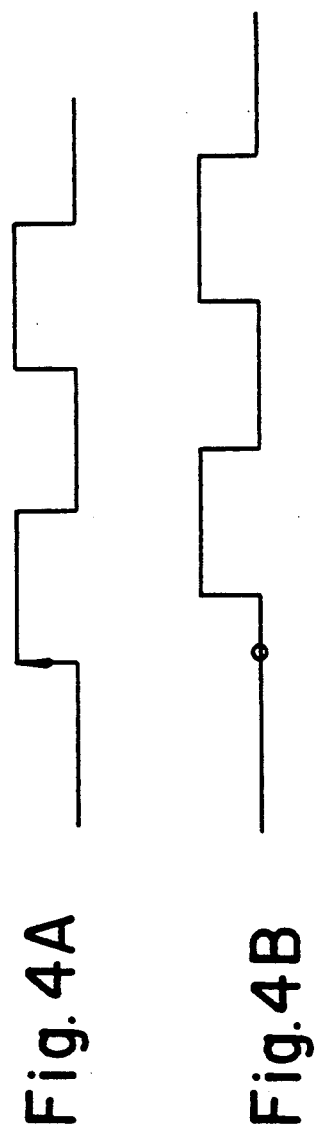
Fig. 2
Fig. 3
Fig. 4A
Fig. 4B

METHOD OF DETERMINING THE ROTATIONAL SPEED OF A MACHINE, AND DEVICE FOR PERFORMING THE METHOD

This application is a continuation of application Ser. No. 348,985, filed May 8, 1989, now abandoned.

BACKGROUND OF THE INVENTION

1. Field of the Invention

The invention relates to a method of determining the rotational speed of a machine having a drive into which a setpoint value for the rotational speed has been introduced, and a rotational-speed sensor from which a measured actual value is obtainable.

2. Description of the Related Art

Rotational-speed sensors have become known heretofore for measuring the rotational speed of a machine, particularly for purposes of control. If errors occur in this connection, faulty control of the machine may result. Frequently, incremental pulse generators are used as rotational-speed sensors, and angular-speed pulses generated by the incremental pulse generators are counted. It is possible, in this connection for spurious pulses to be produced, for example, due to interference in connecting leads between the incremental pulse generator and a control unit. The reason for spurious pulses may lie also in the incremental pulse generator itself if, for example, opaque particles penetrate into an optical incremental pulse generator. Such spurious pulses may likewise result in falsification of the measured data.

It is accordingly an object of the invention of the instant application to provide a method and device with increased reliability in the determination of the rotational speed of a machine.

SUMMARY OF THE INVENTION

With the foregoing and other objects in view, there is provided in accordance with one aspect of the invention, a method of determining the rotational speed of a machine having a drive into which a setpoint value for the rotational speed has been introduced and a rotational-speed sensor from which a measured actual value is obtainable, which comprises feeding the setpoint value to a mathematical model of a controlled system formed by the drive and the machine, deriving from the output of the mathematical model a computed actual value, determining the difference between the measured actual value and the computed actual value and, if the absolute amount of the difference is exceeded, passing on the computed actual value, and if the absolute amount of the difference is not exceeded, passing on the measured actual value.

In the event of the generation of spurious output signals from the rotational-speed sensor, the method according to the invention limits a deviation of the rotational speed of the machine to a deviation which is provided by the accuracy of the mathematical model.

In accordance with a further mode of the invention, the method includes additionally feeding the actual value, which has been passed on, to the mathematical model of the controlled system.

In accordance with an added mode of the invention, the method includes providing the setpoint value and the actual value in time-quantized form, feeding the setpoint value and the actual value which has been passed on, respectively, delayed by one scanning period, to the mathematical model of the controlled system.

In accordance with an additional mode of the invention, the method includes generating at least two angular-speed signals with an incremental pulse generator, converting the computed actual value for the rotational speed into a computed time and, if a pulse of the angular-speed signal occurs more than a permissible deviation after the computed time, switching over to a different angular-speed signal.

In accordance with again another mode of the invention, the method includes generating at least one angular-speed signal with an incremental pulse generator, converting the computed actual value for the rotational speed into a computed time and, if a pulse of the angular-speed signal occurs more than a permissible deviation before the computed time has elapsed, indicating a spurious pulse.

In accordance with again a further mode of the invention, the method includes generating at least two phase-displaced angular-speed signals with an incremental pulse generator and, by scanning one of the angular-speed signals, generating a direction-of-rotation signal at edges of the other angular-speed signal.

In accordance with again an added mode of the invention, the method includes comparing the direction-of-rotation signal with an inputted machine command and, if deviations exist, generating an error signal.

In accordance with again an additional mode of the invention, the machine drive comprises a drive motor, and the method includes comparing the direction-of-rotation signal with the sign of a value of an electromotive force (e.m.f.) computed from the armature voltage and the armature current of the drive motor of the machine.

In accordance with yet another mode of the invention, the machine drive includes a drive motor, and the method includes additionally comparing the actual value with a further computed actual value which is computed from the armature voltage and the armature current of the drive motor of the machine and if deviations exist which exceed a specified value, generating an error signal.

In connection with the foregoing, a further increase in reliability is afforded, in particular, when at least two angular-speed signals are derived and, if one of the angular-speed signals should fail to appear, an automatic switch-over is made to the other angular-speed signal. In addition, further developments of the method according to the invention include a comparison of the actual value and of a direction-of-rotation signal, respectively, with signals obtained independently of the rotational-speed sensor. Error signals are generated whenever specified deviations are exceeded.

In accordance with a concomitant aspect of the invention, there is provided a device for performing a method of determining the rotational speed of a machine having a drive into which a setpoint value for the rotational speed has been introduced and a rotational-speed sensor from which an actual value is obtainable, comprising a mathematical model of a controlled system formed by the drive and the machine, a device for feeding the set point value to the mathematical model, a device for comparing a computed actual value derived from an output of the mathematical model, a device for comprising a computed actual value derived from an output of the mathematical model with a measured actual value obtained from the rotational-speed sensor, and a device for determining a difference between the measured actual value and the computed actual value and for selectively passing on the computed actual value if the absolute amount of the difference is exceeded, and passing on the measured actual value if the absolute amount of the difference is not exceeded.

Other features which are considered as characteristic for the invention are set forth in the appended claims.

Although the invention is illustrated and described herein as embodied in a method of determining the rotational speed of a machine, and device for performing the method, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which:

FIG. 2 is a plot diagram for explaining occurring actual values and computed actual values, respectively;

FIG. 3 is a part of a block diagram of the embodiment of the switch control device according to FIG. 1 in a somewhat more detailed representation; and FIG. 4 is a waveform diagram of signals A and B.

DESCRIPTION OF THE PREFERRED EMBODIMENTS

Figure 1:
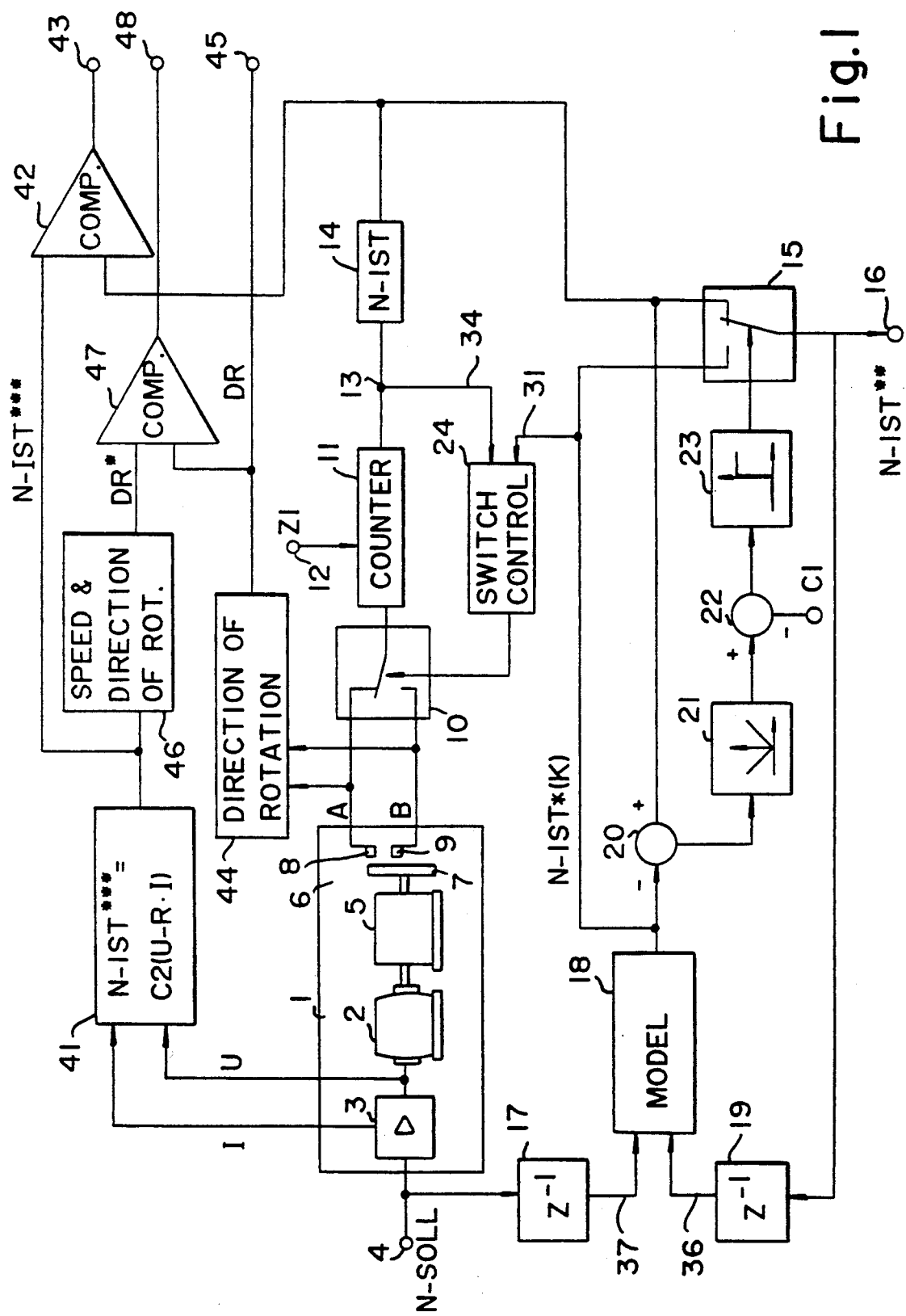
FIG. 1 is a diagrammatic view in the form of a block diagram of a device for performing the method of determining the rotational speed of a machine in accordance with the invention.

Referring now to the drawings and, first, particularly to FIGS. 1 and 3 thereof, there is shown therein, in the interest of clarity, block diagrams of the device for performing the method of determining the rotational speed of a machine in accordance with the invention, representing the various functions to be performed which may be executed by a suitably programmed computer.

The machine 1 which, for example, may be a printing press, contains a drive motor 2, which is controlled via an output stage 3 as a function of a nominal or setpoint value N-SOLL for the rotational speed which is supplied at 4. The part 5 represents a collection of rotating parts of the machine 1, the rotational speed of which is measured with an incremental pulse generator 6. In an advantageous manner, an optical index disc 7 is provided, which is scanned by two optical scanners 8 and 9, which are disposed in a manner that two angular-speed so that the direction of rotation can be determined signals A and B, which are shifted 90° out of phase with one another, are formed. These signals are supplied to a changeover switch 10, so that, at all times, only one of the angular-speed scanning signals A and B reaches a counter 11. Normally, signals A are used. Each signal has a scanning period equal to Ta. The duration of the scanning pulse is a function of the rotational speed.

During one or more periods Ta, respectively, of the angular-speed signal, the counter 11 counts higher-frequency counting pulses ZI supplied at 12, so that the count present at the output 13 of the counter 11 is a measure of the period of the angular-speed signal. This value is converted at block 14 into a value N-IST for the rotational speed and is fed via a changeover switch 15 to the output 16 and is available as N-IST for control purposes. In addition, the setpoint value N-SOLL is supplied via a delay circuit 17, delayed by one scanning period Ta, to input 37 of a mathematical model 18 of the machine 1, the mathematical model 18 also receiving at input 36 the value N-IST, likewise delayed by one scanning period Ta at delay circuit 19.

In FIG. 1, a value N-IST* is derived by the mathematical model 18 from the values supplied. The following function is applied with regard thereto:

$$N\text{-}IST^*(k) = V \cdot N\text{-}IST^{**}(k-1) + (1-V) \cdot N\text{-}SOLL(k-1), \quad \text{(Eq. 1)}$$

wherein $V = e^{-Ta/T}$, Ta is the scanning period and T is the time constant of the system, and k represents a scanning cycle. The thus computed actual value N-IST* is compared as follows with the actual value N-IST. First of all, a subtraction 20 is performed, whereupon, at circuit 21, the absolute value of the difference is formed. At summing circuit 22, a constant C1 is subtracted from the absolute value. At circuit 23, a binary signal is generated depending upon whether the difference formed at circuit 22 is less than 0, or greater than or =0. The changeover switch 15 is then set so that the value N-IST is sent to the output 16 if the difference is smaller than the constant, i.e. less than 0, C1, whereas, if the difference is greater than or equal to 0, indicating an error condition, the switch 15 is set to the non-illustrated left-hand position so that the output at 16 becomes equal to N-IST* (k) instead of the false value N-IST**.

In the case of a large deviation, therefore, it is assumed that N-IST is in error and that the computed value N-IST* formed by the mathematical model 18 is closer to the true value of the rotational speed N.

The changeover switch 10 can be controlled by a switch control device 24 so that, if one of the angular-speed signals fails to appear, a switch is made to the other signal. Details of this are explained hereinafter in conjunction with FIG. 3.

FIG. 2 represents in a readily apparent manner the rotational-speed values occurring in the embodiment shown in FIG. 1, with the tolerance range for N-IST* being indicated by the shaded area. An actual value N-IST** (k−1) is shown for the preceding scanning instant k−1, while further values relate to the scanning instant k.

FIG. 3 illustrates a circuit which is suitable for the switch control apparatus 24 (FIG. 1). The value N-IST* (k) is fed via an input 31 to a circuit 32 for the formation of its reciprocal times a constant $C3 = 3 \cdot 6 \cdot 10^6$. The output signal of the circuit 32 represents a time Z(k), which corresponds to the period of the angular-speed pulses or a multiple thereof, if the counter 11 is driven with frequency-divided angular-speed signals. A tolerance time ΔZ is added to the time Z(k) at summing circuit 33. The resulting value Z* (k) is subtracted in the summing circuit 35 from the output signal 34 of the counter 11 which is supplied at 34. Depending upon the difference, a binary signal is generated at 36 which can be used to cause actuation of the changeover switch 10. In the preferred embodiment of the invention, however, the signal is supplied as a program-interrupt signal (IR) to a computer, which, in turn, controls the changeover switch 10. This has the advantage that even further checks can be performed in the computer and that, besides causing the changeover, an alarm, for example, can also be triggered. Furthermore, measures may be provided in the computer for the event that both angular-speed signals are in error.

For further monitoring, in the case of a direct-current motor 2 is used for driving the machine the electromotive force of the motor 2 can be computed and compared as a further computed actual value N-IST* with the actual value N-IST supplied by the rotational-speed sensor. This is effected in the embodiment according to FIG. 1 by a speed and direction of rotation circuit 41, to which the armature voltage and the armature current are fed. The further computed actual value then results as N-IST*=C2(U-R·I), wherein C2 is a constant, U is the armature voltage, R is the armature resistance and I is the armature current. The output signal of the circuit 41 is fed to a comparator 42, the construction of which is similar to that of the circuits 20 to 23. In the case of deviations that exceed a specified value, an error signal is generated at the output 43 of the comparator 42.

From the angular-speed signals A and B, it is possible by scanning one of the angular-speed signals, to obtain in well-known manner a direction-of-rotation signal from the edges of the other signal. The direction of rotation circuit 44 is provided for this purpose. A direction-of-rotation signal DR can be obtained for control purposes from the output 45 of the circuit 44. In order, once again, to detect malfunctions in the rotor, i.e. optical disk 7 of the incremental pulse generator 5, another direction of rotation signal DR is derived from a speed and direction of rotation circuit 46 by means of the output signal of the circuit 41, the signal DR* representing the sign of the electromotive force U of output stage 3. This signal is compared in a comparator 47 with the direction-of-rotation signal DR obtained from the angular-speed signals. In case of any deviation, an error signal is fed to the output 48.

The speed and direction of rotation circuit 18 is defined by the equation shown at page 9, line 1.

Block 46 generates an output signal representing the direction of rotation of the motor 2 as it should be according to outputs I and U from output stage 3, connected to the speed and direction of rotation circuit 41.

Block 44 serves to generate a direction of rotation signal based on the two mutually phase shifted signals A and B (FIG. 4). At the time of each rising edge of signal A, the logic level of signal B is tested. During right-hand rotation, the logic level of B is always low, and signal DR accordingly is logic zero. Conversely, if the direction of rotation were left handed, the logic level of signal B would be logic one.

In blocks switch 10 and switch control 24 mentioned above at page 9 (3) in connection with FIG. 3, the input variable 31, N-IST* (k), is connected to the lower input of block 24, and input variable 34 is connected to the upper input of switch control 24.

EXAMPLE

The printing machine 1 is assumed to have a time constant T=1 sec. The optical disc 7 has 1000 increments. The counter 11 is a 23-bit binary counter driven by a 1 MHz clock 12. The prescribed RPM, N-SOLL (4), for the machine, is entered by means of a keyboard. A microprocessor i.e. computer is used to realize blocks 17, 18, 19, 20, 21, 22, 23, 15, 14, 10, 11, 44, 41, 46, 47, and 42, and to evaluate the prescribed RPM N-SOLL (4).

The microprocessor works with a scan period $T_A = 5$ m sec.

With these values, we obtain:

1. For block, model 18, $$(N\text{-}IST^*)(k) = V(V\text{-}IST^*)(k-1) + (1-V)(N\text{-}SOLL)(k-1)$$

wherein $V = e^{-(Ta/T)} = e^{-(5msec/1sec)} = 0.995$

From Equation 1, page 9:

$$(N\text{-}IST^*)(k) = 0.995 \\ ((N\text{-}IST^{**})(k-1)) + 0.005(N\text{-}SOLL)(k-1)$$

2. For evaluation of the RPM values (11), (12), (13), and (14) we obtain:

$$(N\text{-}IST) = 1/T \ [1/sec] \quad \text{(a)}$$

$$(N\text{-}IST) = 60/T \ [RPM] \quad \text{(b)}$$

$$(N\text{-}IST) = 3600/T \ [PRINTS/h] \quad \text{(c)}$$

wherein $T_{INCR}$=duration of one RPM in seconds, and one increment of the optical disc=1/1000 revolution.

$$T_{INCR} = T/1000. \quad \text{(d)}$$

By inserting (d) into (c), we obtain:

$$(N\text{-}IST) = 3600/(1000 \ T_{INCR}) \ [PRINTS/h] \quad \text{(e)}$$

The counter 11 is driven by a clock $f_{Z1}$ (12) = 1 MHz $$T_{INCR} = Z/f_{Z1} = Z/10^6 \ sec, \quad \text{(f)}$$

wherein Z = number of clock pulses = 0/sec $Z = (2^{23} - 1)/10^6 = 8.388607$

Inserting (f) into (e) gives:
$$(N\text{-}IST) = 3600/Z \ [PRINTS/h] \quad \text{(h)}$$

In the following equations (Eq. 1) and (2h) are and will be addressed in order to clarify the individual blocks by means of some examples:

1. Examples of Undisturbed Operation.

Blocks (10), (15) are in normal condition, i.e.:

a) (N-IST*) = (N-IST), (Block 15)

b) line A is connected to the input of counter 11.

With block 10 in operated condition, the machine RPM is constant at 5000 prints/h.

A tolerance of 2% in the measurement of the machine RPM by block MODEL (18) is assumed in the following examples:

At 5000 prints/h, the duration of one increment of the optical disc is equal to 720 u sec; i.e. the counter 11 counts to Z=720.

According to equation (2h)

$$(N\text{-}IST) = (3.6 \times 10^6/720) \times (PRINTS/h) = 5000 \ prints/h$$

The block MODEL (18) delivers, according to equation 1:

$$(N\text{-}IST^*) = 0.995 \times 5000 \ prints/h + 0.005 \times 5000 \ prints/h = 5000 \ prints/h$$

By means of blocks 20 and 21, it is found that;

$$= (N\text{-}IST) - (N = IST^*) = 5000 \text{ prints}/h - 5000 \text{ prints}/h = 0$$

In block 22, $\Delta$ is compared with the maximally allowable deviation C1:

$$\Delta - C1 = 0 - 100 \text{ prints}/h < 0$$

Since this difference is negative, Block 23 gives zero at its output, and it therefore follows that switch 15 stays in its normal position, in other words (N-IST**) = (N-IST).

We claim:

1. Method of determining the rotational speed of a machine having a drive into which a setpoint value for the rotational speed has been introduced and a rotational-speed sensor from which a measured actual value is obtainable, which comprises feeding the setpoint value to a mathematical model of a controlled system receiving inputs from the drive and the machine, deriving from the output of the mathematical model a computed rotational speed value, determining the difference between the measured rotational speed value and the computed rotational speed value, forming the absolute value of the difference, and, if the absolute value of the difference exceeds a given constant, using the computed rotational speed value, and if the absolute value of the difference does not exceed the given constant, using the measured rotational speed value as the determined rotational speed of the machine.

2. Method according to claim 1, which includes additionally feeding the determined rotational speed, to the mathematical model of the controlled system.

3. Method according to claim 1, which includes providing the setpoint value and the actual value in time-quantized form, feeding the setpoint value and the determined rotational speed which has been used, respectively delayed by one scanning period, to the mathematical model.

4. Method according to claim 1, which includes generating at least two angular-speed signals with an incremental pulse generator, converting one of the angular speed signals into a rotational speed value for a computed time and, if a pulse of one of the angular-speed signals occurs more than a permissible delay after the computed time, switching over to the other one of the angular-speed signals.

5. Method according to claim 1, which includes generating at least one angular-speed signal with an incremental pulse generator, converting the one of the angular speed signals into a rotational speed value for a computed time and, if a pulse of one of the angular-speed signals occurs more than an a permissible delay before the computed time has elapsed, indicating a faulty angular speed signal.

6. Method according to claim 1, which includes generating at least two phase-displaced angular-speed signals with an incremental pulse generator and, by scanning one of the angular-speed signals, generating a direction-of-rotation signal at edges of the other angular-speed signal.

7. Method according to claim 6, which includes comparing the direction-of-rotation signal with an entered machine command and, if deviations are determined, generating an error signal.

8. Method according to claim 6, wherein the machine drive comprises a drive motor, the method which includes comparing the direction-of-rotation signal with the sign of a value of an electromotive force (e.m.f.) computed from the armature voltage and the armature current of the drive motor of the machine.

9. Method according to claim 1, wherein the machine drive includes a drive motor, the method which includes additionally comparing the value with a further computed actual value which is computed from the armature voltage and the armature current of the drive motor of the machine and if deviations are determined which exceed a specified value, generating an error signal.

10. Device for performing a method of determining the rotational speed of a machine having a drive into which a setpoint value for the rotational speed has been introduced and a rotational-speed sensor from which an actual value is obtainable, comprising a mathematical model of a controlled system receiving inputs from the drive and the machine, means for feeding the set point value to said mathematical model, means for comparing a computed rotational speed value derived from an output of said mathematical model, means for comparing the computed rotational speed value derived from said mathematical model with a measured rotational speed value obtained from the rotational-speed sensor, and means for determining a difference between the measured rotational speed value and the computed rotational speed value and for selectively outputting the computed rotational speed value if the absolute amount of the difference exceeds a given constant, and outputting the measured rotational speed value if the absolute value of the difference does not exceed the given constant as the determined rotational speed of the machine.

* * * * *